(12) United States Patent  
Law et al.

(10) Patent No.: US 8,911,580 B2
(45) Date of Patent: Dec. 16, 2014

(54) METHOD FOR PRODUCING A STRUCTURAL COMPONENT

(75) Inventors: Barnaby Law, Weyhe (DE); Hauke Lengsfeld, Helmste (DE)

(73) Assignee: Airbus Operations GmbH, Hamburg (DE)

( * ) Notice: Subject to any disclaimer, the term of this patent is extended or adjusted under 35 U.S.C. 154(b) by 1003 days.

(21) Appl. No.: 12/528,887

(22) PCT Filed: Mar. 26, 2008

(86) PCT No.: PCT/EP2008/053539
§ 371 (c)(1),
(2), (4) Date: Mar. 24, 2010

(87) PCT Pub. No.: WO2008/119701
PCT Pub. Date: Oct. 9, 2008

(65) Prior Publication Data
US 2010/0139847 A1 Jun. 10, 2010

Related U.S. Application Data

(60) Provisional application No. 60/921,007, filed on Mar. 30, 2007.

(30) Foreign Application Priority Data

Mar. 30, 2007 (DE) .......................... 10 2007 015 517

(51) Int. Cl.
*B29C 70/02* (2006.01)
*B29C 70/30* (2006.01)
(Continued)

(52) U.S. Cl.
CPC ........... *B29C 70/342* (2013.01); *B29K 2709/08* (2013.01); *B29C 70/543* (2013.01);
(Continued)

(58) Field of Classification Search
None
See application file for complete search history.

(56) References Cited

U.S. PATENT DOCUMENTS 4,076,869 A * 2/1978 Flynn ............................ 427/386
5,401,349 A * 3/1995 Goetz et al. ................... 156/286
(Continued)

FOREIGN PATENT DOCUMENTS

DE 198 32 441 1/2000
DE 198 32 441 C1 1/2000
(Continued)

OTHER PUBLICATIONS

Barnaby Law, DMA Presentation, "DMA Dynamisch Mechanische Analyse," given at Private University of Applied Sciences (PFH) in Stade and Gottingen, Germany; Earliest date of presentation—Oct. 7, 2008. (Including translation).

(Continued)

*Primary Examiner* — Barbara J Musser
(74) *Attorney, Agent, or Firm* — Greer, Burns & Crain Ltd.

(57) ABSTRACT

This invention provides a method for producing a structural component, particularly in the aerospace sector. An unhardened prepreg fabric is formed from a composite fiber material, hardenable at a first hardening temperature, into a predetermined shape. The unhardened prepreg fabric is then connected to at least one hardening part of a composite fiber material partially hardened at a second hardening temperature for holding the unhardened prepreg fabric in the predetermined shape, wherein the second hardening temperature is lower than the first hardening temperature. In a further method step the unhardened prepreg fabric connected to the at least one holding part is hardened at the first hardening temperature to form the structural component. The idea on which this invention is based consists in replacing expensive tools of special steel previously used for holding dimensionally unstable prepreg fabrics with at least one holding part of composite fiber materials, wherein the at least one holding part has a lower hardening temperature than the prepreg fabric, and can therefore be produced with a lower cost tool.

34 Claims, 5 Drawing Sheets

(51) Int. Cl.
- B29C 70/54 (2006.01)
- B29C 70/34 (2006.01)
- *B29K 709/08* (2006.01)
- *B29K 707/04* (2006.01)
- *B29K 105/24* (2006.01)
- *B29K 63/00* (2006.01)

(52) U.S. Cl.
CPC ........ *B29K 2707/04* (2013.01); *B29K 2105/24* (2013.01); *B29K 2105/243* (2013.01); *B29K 2105/246* (2013.01); *Y02T 50/433* (2013.01); *B29K 2063/00* (2013.01); *Y02T 50/43* (2013.01)
USPC .................... 156/196; 156/285; 156/307.1

(56) References Cited

U.S. PATENT DOCUMENTS

| | | | | |
|---|---|---|---|---|
| 5,876,546 | A | * | 3/1999 | Cloud .......................... 156/212 |
| 6,849,150 | B1 | * | 2/2005 | Schmidt ........................ 156/285 |
| 7,293,737 | B2 | * | 11/2007 | Engwall et al. ............... 242/590 |
| 2007/0151657 | A1 | | 7/2007 | Garate Fel et al. |
| 2008/0083491 | A1 | * | 4/2008 | Sander et al. ................ 156/278 |

FOREIGN PATENT DOCUMENTS

| | | |
|---|---|---|
| DE | 60 2004 002262 | 4/2007 |
| DE | 10 2006 045633 | 4/2008 |
| EP | 1 149 687 | 10/2001 |
| EP | 1 800 842 | 6/2007 |
| JP | H01-045436 | 5/1983 |
| JP | H01-204922 | 8/1989 |
| JP | H08-258162 | 10/1996 |
| JP | H10-128860 | 5/1998 |
| JP | 2003-053851 | 2/2003 |
| JP | 2005-125558 | 5/2005 |
| JP | 2008-542119 | 11/2008 |
| RU | 2 030 336 | 3/1995 |
| WO | WO 02 066235 | 8/2002 |
| WO | 2004018186 | 3/2004 |
| WO | WO 2006 131532 | 12/2006 |
| WO | WO 2007 074178 | 7/2007 |
| WO | WO 2008 012378 | 1/2008 |

OTHER PUBLICATIONS

Decision to Grant dated Feb. 14, 2012, from from the corresponding Russian application 2009132007/05.
Notification of Reasons for Refusal, Oct. 30, 2012.

* cited by examiner

METHOD FOR PRODUCING A STRUCTURAL COMPONENT

CROSS-REFERENCE TO RELATED APPLICATIONS

This application claims the benefit of U.S. Provisional Application No. 60/921,007, filed Mar. 30, 2007 and German patent application No. 10 2007 015 517.6, filed Mar. 30, 2007, the entire disclosure of which are herein incorporated by reference.

FIELD OF THE INVENTION

This invention relates to a method for producing a structural component, particularly in the aerospace sector.

Although applicable to any structural components, this invention and the problems on which it is based are explained in greater detail in relation to the production of a T-stringer-stiffened skin of an aircraft.

A multiplicity of methods for producing a T-stringer stiffened skin is known from the state of the art.

One of these methods provides that unhardened 1-stringers be arranged on an unhardened skin. The T-stringers and the skin are in this case each formed from carbon fibre plastic (CFC)-prepreg material. In a further step tools are provided for retaining the T-stringers in position on the skin before and during a subsequent hardening step, and in particular for preventing a "collapse" of the stringer web.

Since the CFC-prepreg material experiences hardly any variation in length at the hardening temperatures required for a high strength of the T-stringer-stiffened skin, ranging from approximately 125 to 180° C., because of its low thermal expansion coefficient, the tools must also be formed from a material which has such a low thermal expansion coefficient and also resists the hardening temperatures.

At present the tools are therefore manufactured from special steel, which involves high costs. Here the costs result on the one hand from the high material price for the special steel itself, and on the other hand from the high expenditure involved in mechanical machining of the material to produce the tools.

Furthermore, such tools are relatively inflexible, i.e. expensive remachining of the tools is required whenever the stringer shape changes, for example.

A further disadvantage of such tools, particularly those for the production of the wing parts of an aircraft up to approximately 35 meters long, lies in their considerable weight, which renders the handling of such tools very difficult.

SUMMARY OF THE INVENTION

It is therefore the object of this invention to provide a method for producing structural components, which is formed from special steel without the tools described above.

According to the invention this object is achieved by a method with the characteristics of Claim 1.

Accordingly a method is provided for producing a structural component, particularly in the aerospace sector, in the following method steps. Firstly an unhardened prepreg fabric is formed from a hardenable composite fibre material into a predetermined shape at a first hardening temperature. In a further method step the unhardened prepreg fabric is connected to at least one holding part, hardened at least partially at a second hardening temperature, for retaining the unhardened prepreg fabric in the predetermined shape. In this case the second hardening temperature is lower than the first hardening temperature. In yet a further method step the unhardened prepreg fabric, connected to the at least one holding part, is hardened to form the structural component at the first hardening temperature.

The idea on which this invention is based consists in supplying a low cost, at least partially hardened holding part of composite fibre material for holding the prepreg fabric during hardening of the same, instead of the expensive tools of special steel.

For this purpose the at least one at least partially hardened holding part consists of a composite fibre material, which already hardens at a comparatively low hardening temperature. Therefore tools may also be provided for producing the at least one holding part from a material which has a comparatively high thermal expansion coefficient. The resultant flexibility in the choice of material enables a material which is both mechanically simple to machine and is relatively low cost, aluminium for example, to be used for the tools for producing the at least one holding part, with the result that only low costs are incurred in the production of the at least one holding part. The at least one holding part produced at low cost in this manner is then connected in a certain form to unhardened and hence dimensionally unstable prepreg fabric for holding it.

The at least one holding part of composite fibre material also has the advantage that it has a very similar thermal expansion coefficient to that of the composite fibre material of the unhardened prepreg fabric. Consequently there are no harmful stresses between the prepreg fabric and the at least one holding part during hardening at the high hardening temperature.

The dependent claims describe advantageous improvements and developments of the inventive method.

The first and second hardening temperatures each relate to a temperature at which a matrix of the composite fibre material of the prepreg fabric or the matrix of the composite fibre material of the at least one holding part is activated, i.e. a cross-linkage takes place between the macromolecular main chains of the respective matrix take place.

A prepreg fabric of composite fibre material and a holding part of composite fibre material are understood in this context to consist of fibre structures, in particular tape fabrics, which preferably have a laminated structure. The fibres in the tape fabric are preferably designed in an optimised manner in terms of the loading of the structural component to be produced. The fibre structures and/or fibre fabrics are impregnated with a matrix, in particular an epoxy resin matrix.

"Forming" of the unhardened prepreg fabric into a predetermined shape is preferably understood to mean the hot forming of the unhardened prepreg fabric. However, it is just as possible to carry out the "forming" into a certain shape by depositing the prepreg fabric on a predetermined geometry, for example a tool or on the at least one holding part itself.

An "unhardened prepreg fabric" is understood to mean a non-hardened, even wet prepreg fabric or also an only partially hardened prepreg fabric.

According to a development of the invention the at least one holding part is connected in a firmly bonded manner, during the connection process, to the unhardened prepreg fabric, in the same plane in particular, to form an integral structural component. In principle it would be conceivable to connect the holding part by means of suitable fixing means only, pins for example, to the unhardened prepreg fabric, and harden both in this condition. However, a very much more stable structural component can be achieved when the at least one holding part is connected in a firmly bonded manner to the unhardened prepreg fabric. In an embodiment of this invention the unhardened prepreg fabric is connected to the at least one holding part by pressing them together. This results in an advantageous embedding of the holding part in the prepreg fabric, due in particular to the matrix flow of the prepreg fabric thus achieved. A higher strength of the structural component to be produced is generally achieved.

In an embodiment of the invention the at least one holding part is formed with an inner contour corresponding to an outer contour of the prepreg fabric to be formed before connection. Therefore contact over as large an area as possible, in particular a contiguous contact, can be achieved between the holding part and the prepreg fabric, and hence a particularly good support for the latter.

According to a development of the invention the at least one holding part is formed, before connection, with a radius in a curved fashion, suitable recesses being cut into the at least one holding part to compensate for the material surplus resulting from a region that has been shortened relative to a neutral bending line. The neutral bending line generally defines the region of a curved body in which the material is neither extended nor shortened by bending. The shortened region lies on the side of the radius relative to the neutral bending line. The recesses, for example in the form of approximately triangular incisions in the holding part, prevent buckling of a section of the holding part in the shortened region. In a further step the composite fibre material of the shortened regions, interrupted in sections due to the recesses, for example, can be connected to each other, in particular glued to each other. A curved holding part can be produced very easily by this method, which part may then be used to produce a structural component with a ramp. A further advantage of this is that the holding part itself can be formed in a curved manner without modifications to the tool for producing the holding part. The production costs may therefore be further reduced.

In a development of the invention the prepreg fabric is formed, before or during connection, as a profile, in particular as a T-profile composed of two L-profiles with a blade arranged between them, and/or the at least one holding part may be designed as a profile, in particular as an L-profile. In this context a "profile" is understood to mean a component which extends in a spatial direction, described in the following as the "longitudinal direction", with an essentially constant cross-section. A "blade" is understood to refer to reinforcing layers of composite fibre material which form a geometrically demarcated unit, particularly inside a stringer. In this case the L-profiles of the prepreg fabric may first, for example, be deposited on a holding part designed as an L-profile. In a further step a blade is then arranged on one of the L-profiles of the prepreg fabric. The two holding parts are then pressed together and then retain the prepreg fabric between them. A structural component designed as a T-profile can be easily produced in this manner.

According to a further embodiment two holding parts are provided which receive the prepreg fabric between them. In this context "receiving" refers to receiving in sections, or even to its full extent. This therefore enables the prepreg fabric which is still dimensionally unstable to be supported.

According to a development of the invention the two holding parts are brought into contact with each other at least in sections. Therefore the space between the two holding parts, to be occupied by the hardened prepreg fabric in particular, can be precisely defined.

According to a development, the unhardened prepreg fabric, connected to the at least one holding part, is arranged before hardening on a skin of composite fibre material in particular, the prepreg fabric and/or the at least one holding part being brought into contact with the skin. In the subsequent hardening process a stringer-stiffened skin can therefore be produced, the skin supporting the prepreg fabric on one side and the at least one holding part in particular supporting one web of the prepreg fabric.

According a further embodiment of the invention a matrix of the prepreg fabric is provided with a hot hardener, in particular diaminodiphenyl sulphone, which hardens within a temperature range of between 110 and 200° C. in particular, and/or a matrix of the at least one holding part is provided with a cold hardener, in particular isophorone diamine or a cold hardener on an anhydrite basis, which hardens within a temperature range of between 20 and 100° C. in particular. The desired properties of the structural component in terms of strength can be achieved with the hot hardener, whilst low cost production of the structural component is achieved with the cold hardener sine a low cost material can be used for the tool for producing the holding part.

According to a development of the invention the composite fibre material of the prepreg fabric has carbon fibres and/or the composite fibre material of the at least one holding part has glass fibres and/or carbon fibres and/or natural fibres. The carbon fibres of the holding part are preferably highly favourable fibres because they are not high quality. Therefore a structural component with the desired high strength can be obtained, whilst the holding part can be produced at low cost. If the holding part is formed from GFP, there is the added advantage that the notch bar impact strength of the structural component is increased. There is also improved corrosion protection and protection from lighting strikes in cases where the structural part is connected to metal connection elements.

The structural component is preferably designed as a stringer, a rib or a skin with at least one stringer or at least one rib.

BRIEF DESCRIPTION OF THE DRAWINGS

The invention is explained in greater detail in the following by means of exemplary embodiments with reference to the attached figures of the drawing.

In the figures.

DETAILED DESCRIPTION OF THE DRAWINGS

In the figures the same reference symbols denote the same or functionally similar components, unless otherwise indicated.

Figure 1:
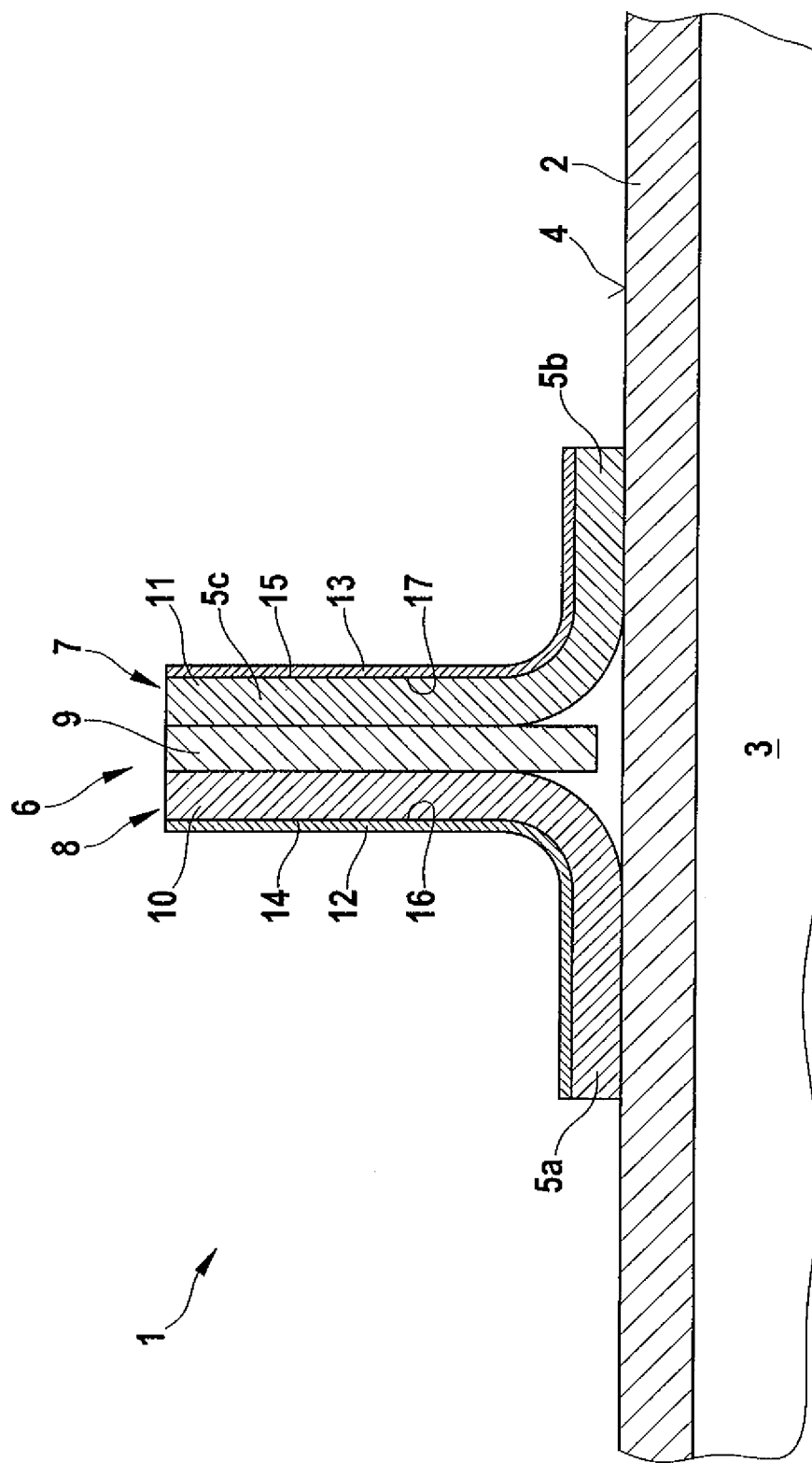
FIG. 1 shows in a cross-sectional view a method condition of a method according to an exemplary embodiment of this invention.

FIG. 1 shows, in a cross-sectional view, a method condition of a method according to an exemplary embodiment of this invention.

An arrangement 1 has a skin 2, preferably of non-hardened CFC, which is arranged on a lamination device 3. On its upper side 4 skin 2 is in firmly bonded contact with a foot 5a, 5b of an unhardened prepreg fabric 6, which has a T-shaped cross-section. Unhardened prepreg fabric 6 was produced by pressing two mirror symmetrical L-profiles 7, 8, preferably each of unhardened CFC tape fabric having an epoxy resin matrix, with a blade 9 arranged between them, preferably also of unhardened CFC tape fabric having an epoxy resin matrix. Blade 9 forms, with two legs 10, 11 of L-profiles 7 and 8 respectively, a web 5c of prepreg fabric 6. L-profiles 7, 8 of prepreg fabric 6 itself were preferably brought into the L-shape shown by hot forming.

Prepreg 6, still unhardened, is still in a dimensionally unstable condition. For maintaining the T-shape of prepreg fabric 6 shown in FIG. 1, two dimensionally stable holding parts 12, 13, which are preferably each designed as a L-profile of at least partially hardened GFP (glass fibre plastic), are provided so that they are mirror symmetrical. Web 5c of prepreg fabric 6 in particular is in this case supported by holding parts 12, 13. For this purpose an outer contour 14, 15 of L-profiles 7 and 8 respectively of prepreg fabric 6 is brought into firmly bonded contact with an inner contour 16 and 17 of holding parts 12 and 13 respectively.

Holding parts 12, 13 are produced by means of a tool of aluminium or an aluminium alloy at a hardening temperature of approximately 80° C., with activation of a cold hardener, for example isophorone diamine. Holding parts 12, 13 preferably have in this case a structure of two layers of glass fibre fabric which are impregnated with an epoxy resin matrix comprising the cold hardener.

To form the structural component arrangement 1 in FIG. 1 is packed into a vacuum bag and hardened in the autoclave, for example (not shown). The hardening takes place in the autoclave at approximately 180° C., a suitable hot hardener, for example diaminodiphenyl sulphone, being hardened in the matrix of prepreg fabric 6 or of L-profiles 7, 8 and of blade 9. The structural component produced is then similar to arrangement 1 shown in FIG. 1, but all components 2, 6, 12, 13 are hardened and are connected solidly to each other in one piece, forming a stringer on a skin.

Figure 2:
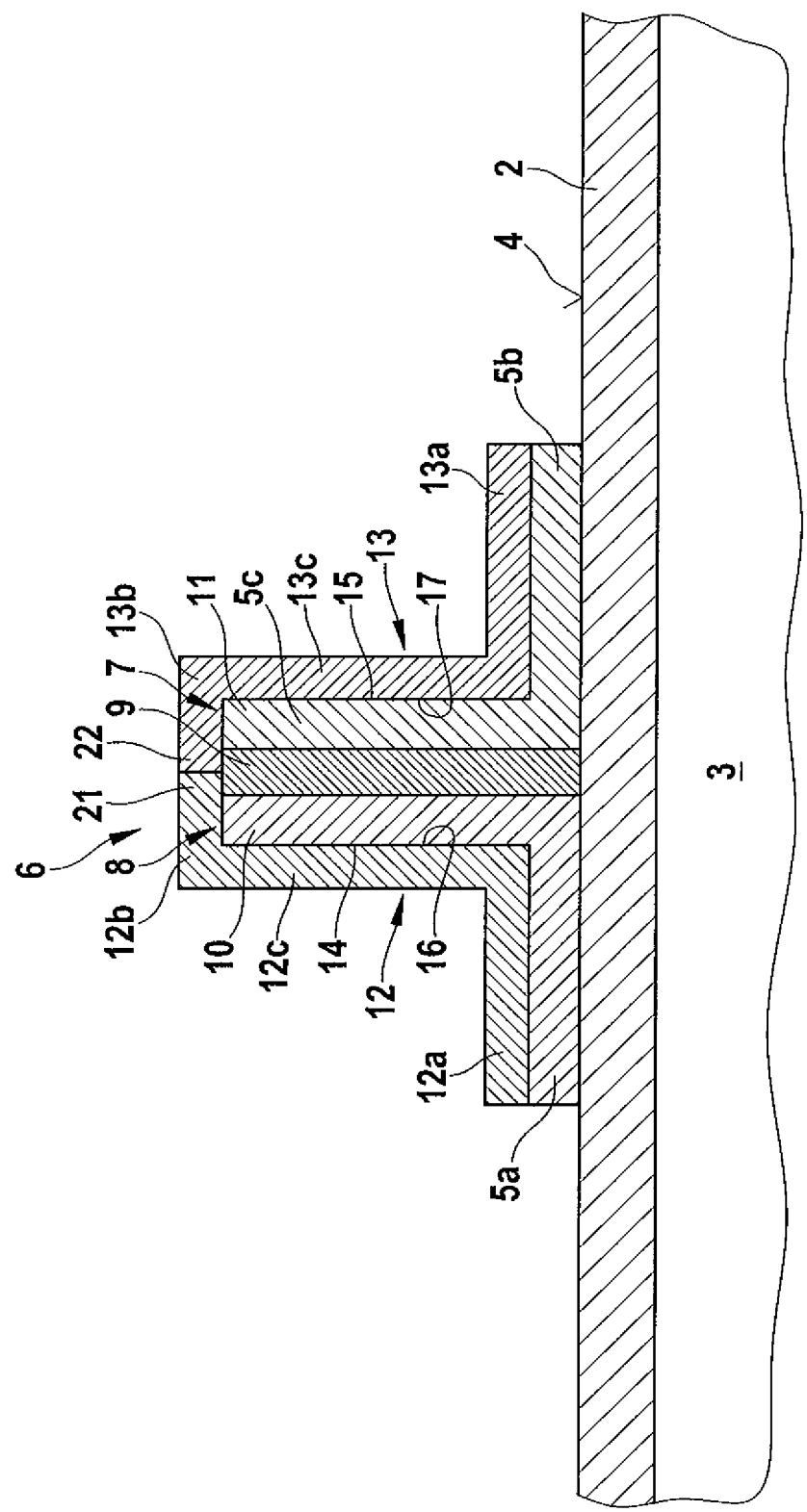
FIG. 2 shows in a cross-sectional view a method condition of a method according to a further exemplary embodiment of this invention.

The exemplary embodiment in FIG. 2 differs from that in FIG. 1 in that holding parts 12, 13 are designed as Z-profiles with web 12c and 13c extending perpendicularly to feet 12a, 12b and 13a, 13b respectively. Here holding parts 12, 13 are brought into contact with each other at their end 21, 22 assigned to feet 12b, 13b, preferably in the region of web 5c and blade 9 of prepreg fabric 6.

Figure 3:
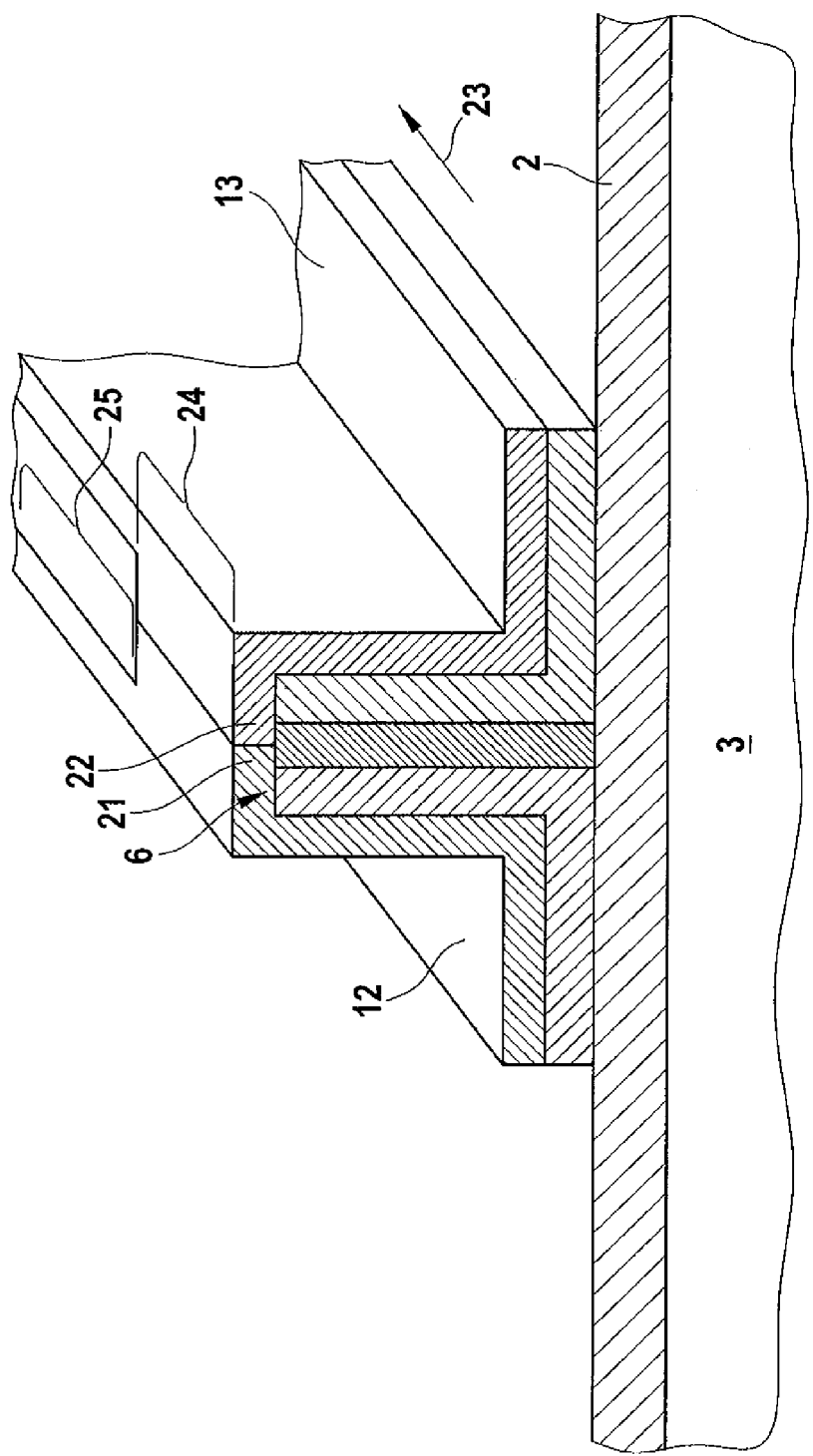
FIG. 3 shows in a perspective cross-sectional view a method condition of a method according to a further exemplary embodiment of this invention.

As can be seen in FIG. 3, this contact can also be brought about in sections only according to the exemplary embodiment in FIG. 2. Ends 21, 22 of holding parts 12, 13 are in this case in contact in longitudinal direction 23 along a section 24, whilst they are recessed in a section 25 connecting to section 24 in longitudinal direction 23. This also provides the advantage, already described, that holding elements 12, 13 occupy a defined distance to each other and material and hence weight can be saved at the same time.

Figure 4:
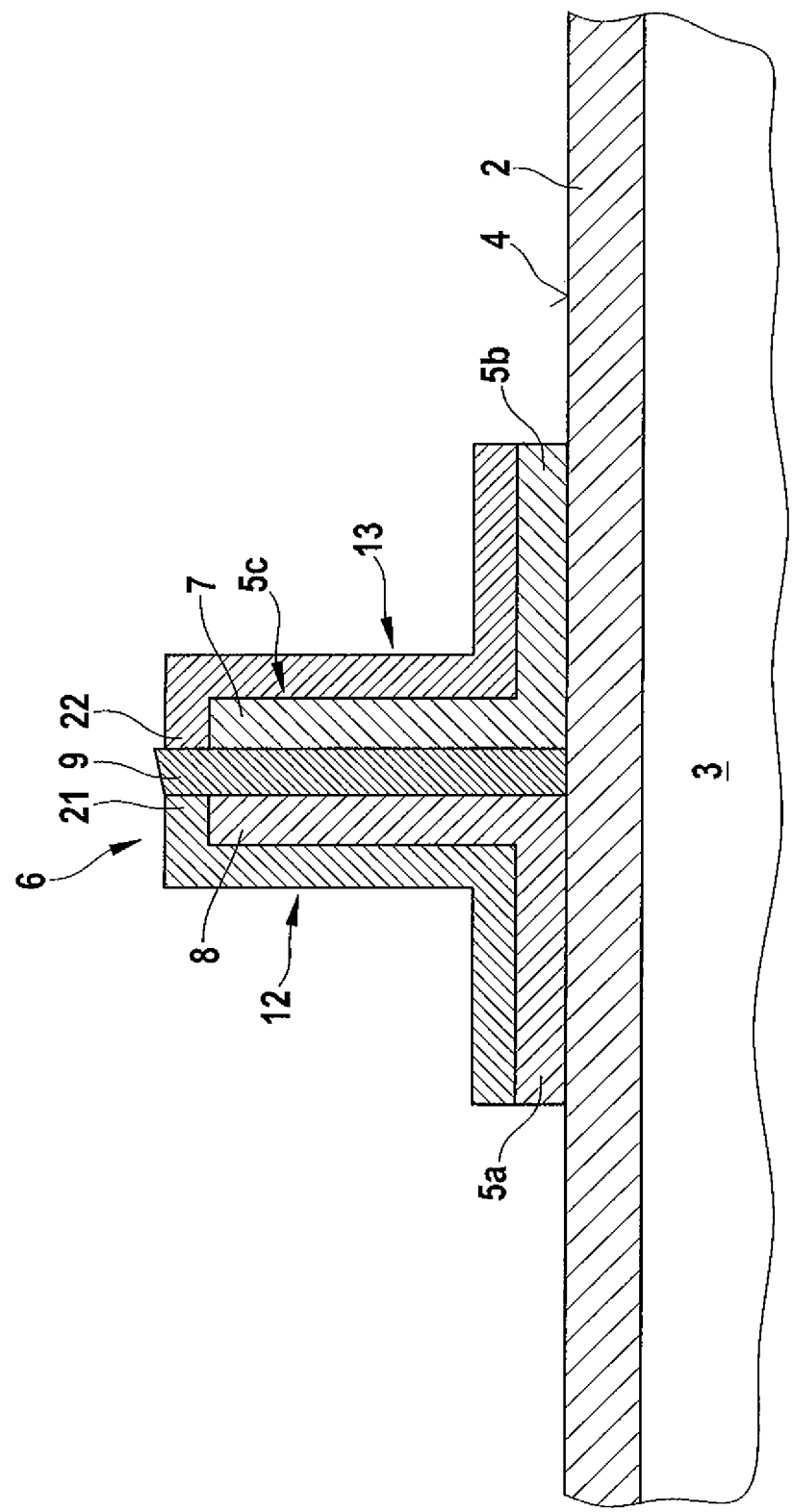
FIG. 4 shows in a cross-sectional view a method condition of a method according to yet a further exemplary embodiment of this invention.

The exemplary embodiment according to FIG. 4 differs from that shown in FIG. 2 in that blade 9 extends between ends 21, 22, ends 21, 22 being in contact with the blade. This guarantees a constant distance between holding parts 12, 13.

Figure 5A:
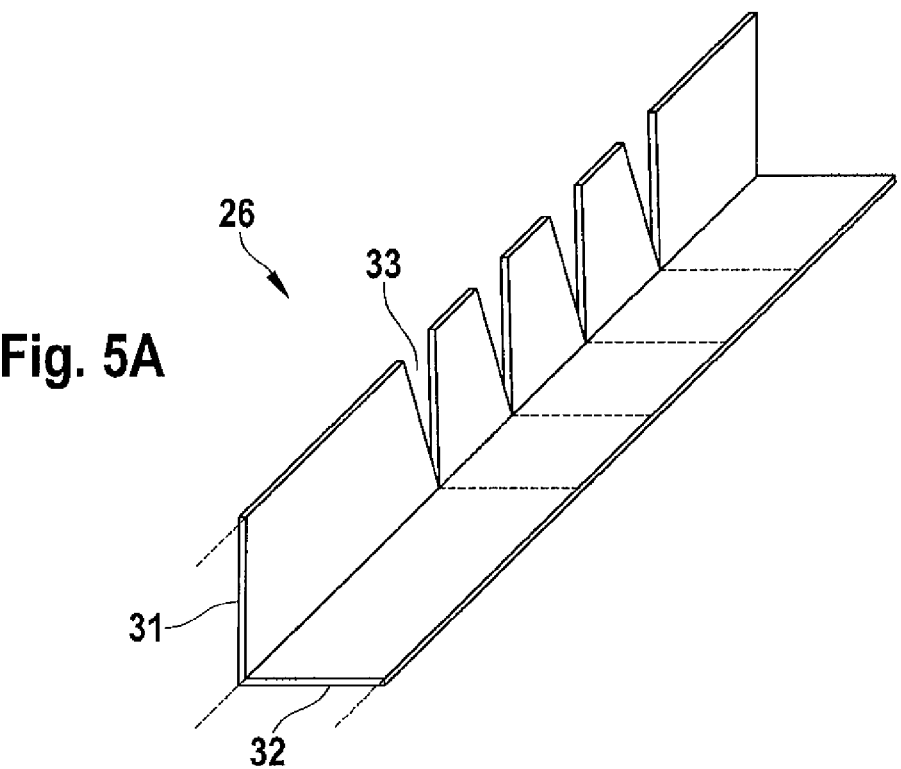
FIG. 5A shows in a perspective view a method condition of a method according to yet a further exemplary embodiment of this invention.
Figure 5B:
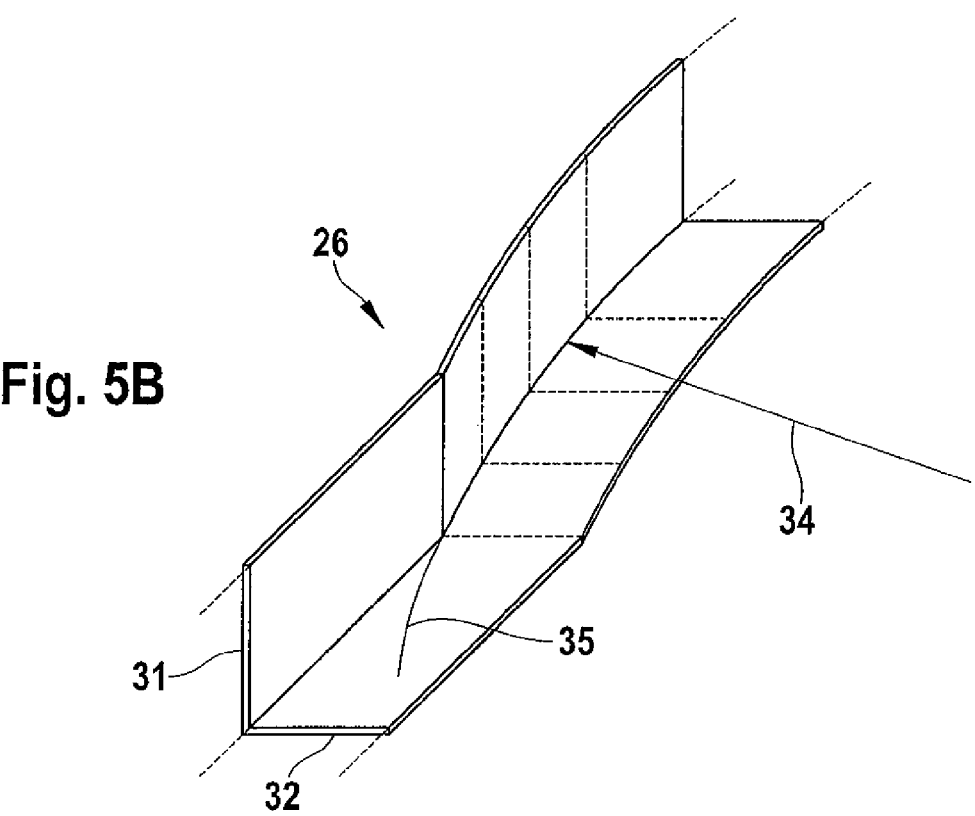
FIG. 5B shows in a perspective view a further method condition according to the exemplary embodiment in FIG. 5A.

FIG. 5A shows an L-profile 26 of at least partially hardened GFP with legs 31, 32, triangular recesses (denoted by way of example by reference symbol 33) are cut from leg 31. As shown in FIG. 5B, L-profile 26 is curved about a radius 34. Here a neutral bending line 35 extends essentially in the plane of leg 32. Recesses 33, closed in the curved condition of L-profile 36, are then glued to produce a stable L-profile 26, which can then be used as holding part 12 or 13 according to the above exemplary embodiments.

Although this invention has been described above with reference to several exemplary embodiments, it is not limited to them but can be modified in a variety of ways For example, a non-impregnated fibre moulding may be used instead of an unhardened prepreg fabric, which moulding is not impregnated with a matrix having a hot hardener and is then hardened until after it has been connected to at least one holding part at least partially hardened by means of a cold hardener for holding the fibre moulding in a predetermined shape or has been arranged inside the same.

This invention provides a method for producing a structural component, in particular in the aerospace sector, with the following method steps. An unhardened prepreg fabric is first formed from a composite fibre material hardenable at a first hardening temperature into a predetermined shape. The unhardened prepreg fabric is then connected to at least one holding part of a composite fibre material partially hardened at a second hardening temperature for holding the unhardened prepreg fabric in the predetermined shape, the second hardening temperature being lower than the first hardening temperature. In a further method step the unhardened prepreg fabric connected to the at least one holding part is hardened to form the structural component at the first hardening temperature. The idea forming the basis of this invention consists in replacing expensive tools of special steel previously used for holding dimensionally unstable prepreg fabrics with at least one holding part of composite fibre material, the at least one holding part having a lower hardening temperature than the prepreg fabric and therefore able to be produced by means of a lower cost tool.

LIST OF REFERENCE SYMBOLS

1 Arrangement
2 Skin
3 Laminating device
4 Surface
5a Foot
5b Foot
5c Web
6 Prepreg fabric
7 L-profile
8 L-profile
9 Blade
12 Holding part
12a Foot
12b Foot
12c Web
13 Holding part
13a Foot
13b Foot
13c Web
14 Outer contour
15 Outer contour
16 Inner contour
17 Inner contour
21 End
22 End
23 Longitudinal direction
24 Section
25 Section 26 L-profile
31 Leg
32 Leg
33 Recess
34 Radius
35 Bending line

The invention claimed is:

1. A method for producing a structural component, comprising the following method steps:
   forming an unhardened prepreg fabric from a composite fibre material, hardenable at a first hardening temperature, into a predetermined three-dimensional shape;
   connecting the unhardened prepreg fabric to at least one holding part of a composite fibre material, the at least one holding part being at least partially hardened at a second hardening temperature and therefore dimensionally stable, such that the at least one holding part holds the unhardened prepreg fabric in the predetermined three-dimensional shape, wherein the second hardening temperature is lower than the first hardening temperature; and
   hardening the unhardened prepreg fabric connected to the at least one holding part for forming the structural component at the first hardening temperature, whereby the at least one holding part is integrated in or forms a part of the structural component.

2. The method according to claim 1, wherein during the connection step the at least one holding part is connected in a firmly bonded manner to the unhardened prepreg fabric for forming an integral structural component.

3. The method according to claim 2, wherein the unhardened prepreg fabric and the at least one holding part are pressed together for their connection.

4. The method according to claim 1, wherein the at least one holding part is formed before the connection step with an inner contour corresponding to an outer contour of the prepreg fabric to be formed, wherein the inner contour of the at least one holding part contacts the outer contour of the unhardened prepreg fabric in the connection step.

5. A method for producing a structural component, comprising the following method steps:
   forming an unhardened prepreg fabric from a composite fibre material, hardenable at a first hardening temperature, into a predetermined shape;
   connecting the unhardened prepreg fabric to at least one holding part of a composite fibre material, the at least one holding part being at least partially hardened at a second hardening temperature and therefore dimensionally stable, such that the at least one holding part holds the unhardened prepreg fabric in the predetermined shape, wherein the second hardening temperature is lower than the first hardening temperature; and
   hardening the unhardened prepreg fabric connected to the at least one holding part for forming the structural component at the first hardening temperature, whereby the at least one holding part is integrated in or forms a part of the structural component,
   wherein before the connection step the at least one holding part is formed with a radius in a curved fashion, wherein suitable recesses are cut into the at least one holding part for compensating for the surplus material resulting from a region shortened in relation to a neutral bending line.

6. The method according to claim 1, wherein before or during the connection step at least one of the prepreg fabric and the at least one holding part is designed as a profile.

7. A method for producing a structural component, comprising the following method steps:
   forming an unhardened prepreg fabric from a composite fibre material, hardenable at a first hardening temperature, into a predetermined shape;
   connecting the unhardened prepreg fabric to at least one holding part of a composite fibre material, the at least one holding part being at least partially hardened at a second hardening temperature and therefore dimensionally stable, such that the at least one holding part holds the unhardened prepreg fabric in the predetermined shape, wherein the second hardening temperature is lower than the first hardening temperature; and
   hardening the unhardened prepreg fabric connected to the at least one holding part for forming the structural component at the first hardening temperature, whereby the at least one holding part is integrated in or forms a part of the structural component,
   wherein two holding parts are provided for connection to the unhardened prepreg fabric, wherein the two holding parts receive and support the prepreg fabric between them.

8. The method according to claim 7, wherein the two holding parts are brought into contact with each other, at least in sections, during the connection.

9. The method according to claim 1, wherein the unhardened prepreg fabric connected to the at least one holding part is arranged, before hardening, on a skin of composite fibre material, wherein at least one of the prepreg fabric and the at least one holding part are brought into contact with the skin.

10. The method according to claim 1, wherein at least one of a matrix of the prepreg fabric is provided with a hot hardener, which hardens within a temperature range of between 110 degrees and 200 degrees Celsius, and a matrix of the at least one holding part is provided with a cold hardener, which hardens within a temperature range of between 20 degrees and 100 degrees Celsius.

11. The method according to claim 1, wherein at least one of the composite fibre material of the prepreg fabric is formed with carbon fibres and the composite fibre material of the at least one holding part is formed with at least one of glass fibres, carbon fibres and natural fibres.

12. The method according to claim 1, wherein the structural component is designed as one of a stringer, a rib and a skin with at least one of a stringer and a rib.

13. The method according to claim 2, wherein the at least one holding part is connected in a firmly bonded manner to the prepreg fabric in the same plane.

14. The method according to claim 6, wherein before or during the connection step the prepreg fabric is designed as a T-profile composed of two L-profiles with a blade arranged between them.

15. The method according to claim 6, wherein before or during the connection step the at least one holding part is designed as an L-profile.

16. The method according to claim 10, wherein the hot hardener is diminodiphenyl sulphone and the cold hardener is isophorone diamine or is on an anhydrite basis.

17. A method for producing a structural component, comprising the steps:
   forming an unhardened prepreg fabric of a composite fibre material into a predetermined three-dimensional shape, wherein the unhardened prepreg fabric is hardenable at a first hardening temperature;
   connecting the unhardened prepreg fabric to at least one holding part of a composite fibre material, the at least one holding part being at least partially hardened at a second hardening temperature and thus dimensionally stable, such that the at least one holding part holds the unhardened prepreg fabric in the predetermined three-dimensional shape, wherein the second hardening temperature is lower than the first hardening temperature; and hardening the unhardened prepreg fabric connected to the at least one holding part at the first hardening temperature to form an integral structural component comprising the prepreg fabric and the at least one holding part.

18. The method according to claim 17, wherein during the connecting step the at least one holding part is firmly bonded to the unhardened prepreg fabric.

19. The method according to claim 18, wherein the unhardened prepreg fabric and the at least one holding part are pressed together for their connection.

20. The method according to claim 17, wherein the at least one holding part is formed before the connecting step with an inner contour that corresponds to an outer contour of the prepreg fabric in the predetermined shape, wherein the inner contour of the at least one holding part contacts the outer contour of the unhardened prepreg fabric in the connection step.

21. The method according to claim 5, wherein during the connection step the at least one holding part is connected in a firmly bonded manner to the unhardened prepreg fabric for forming an integral structural component.

22. The method according to claim 5, wherein the unhardened prepreg fabric and the at least one holding part are pressed together for their connection.

23. The method according to claim 5, wherein the at least one holding part is formed before the connection step with an inner contour that corresponds to an outer contour of the prepreg fabric to be formed, wherein the inner contour of the at least one holding part contacts the outer contour of the unhardened prepreg fabric in the connection step.

24. The method according to claim 5, wherein before or during the connection step at least one of the prepreg fabric and the at least one holding part is designed as a profile.

25. The method according to claim 5, wherein the unhardened prepreg fabric connected to the at least one holding part is arranged, before hardening, on a skin of composite fibre material, wherein at least one of the prepreg fabric and the at least one holding part are brought into contact with the skin.

26. The method according to claim 5, wherein the composite fibre material of the prepreg fabric is formed with carbon fibres and the composite fibre material of the at least one holding part is formed with at least one of glass fibres, carbon fibres and natural fibres.

27. The method according to claim 5, wherein the structural component is designed as one of a stringer, a rib and a skin with at least one of a stringer and a rib.

28. The method according to claim 7, wherein during the connection step the at least one holding part is connected in a firmly bonded manner to the unhardened prepreg fabric for forming an integral structural component.

29. The method according to claim 7, wherein the unhardened prepreg fabric and the at least one holding part are pressed together for their connection.

30. The method according to claim 7, wherein the at least one holding part is formed before the connection step with an inner contour that corresponds to an outer contour of the prepreg fabric to be formed, wherein the inner contour of the at least one holding part contacts the outer contour of the unhardened prepreg fabric in the connection step.

31. The method according to claim 7, wherein before or during the connection step at least one of the prepreg fabric and the at least one holding part is designed as a profile.

32. The method according to claim 7, wherein the unhardened prepreg fabric connected to the at least one holding part is arranged, before hardening, on a skin of composite fibre material, wherein at least one of the prepreg fabric and the at least one holding part are brought into contact with the skin.

33. The method according to claim 7, wherein the composite fibre material of the prepreg fabric is formed with carbon fibres and the composite fibre material of the at least one holding part is formed with at least one of glass fibres, carbon fibres and natural fibres.

34. The method according to claim 7, wherein the structural component is designed as one of a stringer, a rib and a skin with at least one of a stringer and a rib.

* * * * *